United States Patent [19]

Spilker, Jr.

[11] Patent Number: 5,398,034

[45] Date of Patent: Mar. 14, 1995

[54] VECTOR DELAY LOCK LOOP PROCESSING OF RADIOLOCATION TRANSMITTER SIGNALS

[75] Inventor: James J. Spilker, Jr., Woodside, Calif.

[73] Assignee: Stanford Telecommunications, Inc., Sunnyvale, Calif.

[21] Appl. No.: 38,931

[22] Filed: Mar. 29, 1993

[51] Int. Cl.⁶ .......................... H04B 7/185; G01S 5/02
[52] U.S. Cl. ................................... 342/357; 455/12.1; 455/13.2
[58] Field of Search ............... 342/357; 455/12.1, 13.2

[56] References Cited

U.S. PATENT DOCUMENTS

| | | | |
|---|---|---|---|
| 4,513,285 | 4/1985 | Pike et al. | |
| 4,785,463 | 11/1988 | Janc et al. | 375/1 |
| 5,153,598 | 10/1992 | Alves, Jr. | 342/352 |
| 5,216,429 | 6/1993 | Nakagawa et al. | 342/450 |

OTHER PUBLICATIONS

Copps et al., "Optimal Processing of GPS Signals", Navigation, Fall 1980 pp. 171-1, 2.
Sennott et al., "The Use of Sattellite Geometry For Presentation of Cycle Slips In A GPS Receiver", Navigation, Summer 1992, pp. 217-223.

Primary Examiner—Theodore M. Blum
Attorney, Agent, or Firm—Jim Zegeer

[57] ABSTRACT

A position, time location receiving system deriving its output position estimates from received inputs from a distributed array of pseudonoise multiplexed transmitter channels at determinable spatial positions. The receiving system has a plurality of delay lock loops, one for each transmitter channel. Control signals for the delay lock loops of each transmitter channel are derived from a current estimated location vector (x, y, z) and time.

9 Claims, 4 Drawing Sheets (a) COHERENT DELAY LOCK LOOP (b) NON-COHERENT DELAY LOCK LOOP

VECTOR DELAY LOCK LOOP PROCESSING OF RADIOLOCATION TRANSMITTER SIGNALS

BACKGROUND

Radiolocation systems now in public and military use employ a multiplicity of geographically distributed transmitters producing modulated signals. These transmitters are ground-based in older systems such as Loran. The newest systems, such as the Global Positioning System (GPS) developed by the U.S. Department of Defense, employ multiple earth satellites in known, controlled orbits. At times even these GPS satellites are supplemented by ground-based transmitters called "pseudolites." The basic principle of radiolocation is straightforward: (1) measure the time required for the signal from each transmitter to arrive, and (2) by application of geometry to the set of distances from the satellites, determine the location of the receiver. If the receiver and satellites were all equipped with zero-error time standards, signals from only three (non-coplanar) satellites would be required to locate the receiver instantaneously upon measurement of the signal delays. Timing uncertainty at the receiver adds a fourth dimension to the problem, which can be solved by computing with four remote signals.

In the GPS system, satellite signals are controlled by highly precise (atomic) clocks in the satellites, and are further adjusted by data transmitted periodically from ground control stations. Each satellite transmits, at a low data rate, ground-computed departure from its planned orbit, and ground-observed bias in the satellite clock. Since the original design of the system was based on the requirement that at least four satellites be continuously in view, on or just above the receiver's horizon, a large part of the earth's surface, there are often more than four satellites in radio contact (that is, not eclipsed by the earth). Indeed, the Russian navigation satellites, GLONASS, may also be in view of the receiver and used in the position computation in addition to GPS. There are expected to be 24 GLONASS satellites in orbit.

While a receiver in space would require four satellite signals to locate itself, ground, sea or air based vehicles have additional information about altitude above the earth's surface that assists in obtaining a location solution when fewer than four satellites are within view. For example, a receiver on the ocean surface has a good estimate of altitude above mean sea level.

My invention relates to design of receivers for use in estimating position from signals derived from multiple remote transmitters. Although the invention is preferably for use in connection with GPS, it should be understood that the principles and the invention are more broadly useful.

Glossary of terms as used herein:

Delay-lock loop (DLL): A delay lock loop is an electronic circuit which operates to maintain two signals with the same known time-sequence, in time-synchronism. Typically, a digital pseudo-noise signal is received by radio communication and reference signal with the same binary sequence is generated locally. Because of: uncertainty in time between the remote and local sources, relative motion of the remote and local signal source, transmission delay, and slight differences in timing (clock) frequency, the time difference by which the reference signal must be shifted is not accurately predictable. A delay lock loop[1] includes a correlator (which may also be referred to as a discriminator), and the output of this electrical circuit is minimum when the two input signals are in synchronism. The correlator output goes positive for one direction of time shift between the two signals and negative for the other. It will usually be small unless the two signals are less than about one-half chip interval from exact synchronism. The output of the correlator, usually with high frequency components filtered out, can be used to control the time delay in the reference signal generator by using it to control a number controlled oscillator. In a delay lock loop, the circuit is closed to maintain synchronism. The time delay between the two signals, as indicated by the amount of shift in the local reference generator, can be multiplied by the velocity of light to represent a pseudo-range between the remote source and the local system.

[1] (a name originated by the inventor) Reference - J. J. Spilker, Jr., Digital Communications by Satellite, Prentice Hall, Englewood Cliffs, N.J. 1977.

Pseudo-noise (PN) signal or sequence: The signal produced by a reference generator, usually in the form of a time series of binary digits (bits: zeros or ones). The length of the sequence is the number of bits (chips) in the sequence before it repeats.

Chip: One bit-period of a pseudo-noise signal.

Number controlled oscillator: A frequency synthesizer whose clock phase and rate can be shifted in time by inputting a binary number. If a positive digital value advances the sequence by a corresponding number of steps, a negative value will retard it accordingly.

PN Generator: A pseudonoise sequence generator usually comprised of a feedback shift register with feedback taps and other logic designed to give the proper pseudorandom sequence of binary numbers. The PN generator clock rate and phase can be controlled by an NCO.

Coherent and incoherent signals: In radiolocation terminology, the signal from a remote transmitter is coherent if the timing of the PN signal and that of the carrier frequency are derived from a common timer (clock). If the signal is not coherent, it is usually necessary to maintain separate DLLs in the receiver to track the carrier frequency and the PN modulation of the carrier.

Carrier-tracking loop: With coherent or incoherent signals, a separate loop may be used to track carrier frequency, locking on the intermediate frequency carrier in the receiver. The carrier frequency shift signal is a relative-velocity output that can be separately fed into a location estimator.

Coherent and noncoherent detection and tracking: With coherent tracking the received carrier phase is estimated and used as part of the detection/tracking operation. In noncoherent detection knowledge of carrier phase is not required and envelope or square-law detectors are employed. Noncoherent detectors often are slightly inferior in performance to coherent detectors. However, in some instances coherent detection is not feasible.

PRIOR ART

Prior-art radiolocation receivers, prior to development of the GPS system were usually based on analog filtering, signal processing and estimation. Early signals were not digitally modulated. Receivers for these systems were limited to concurrent reception of a fixed number of channels at different carrier frequencies.

All GPS satellite transmitters operate simultaneously, in the same two frequency bands. A receiver distinguishes one satellite from another by tracking the unique pseudo-noise code sequence each sends. Through use of multiple delay-lock loops operating from the same amplified (and frequency-shifted) signal, a GPS receiver can concurrently track and measure pseudo-range from any number of the satellites currently in view.

FIG. 1a illustrates a typical design of prior art. The user position vector, including user clock bias can usually be modeled as shown in 10. The user position and satellite position are then transformed by a nonlinear transformation t in block 11 to produce the range function for each satellite which then drives a set of modulators 12. The output of 12 plus receiver noise can be used to model the received noisy signal r(t). The noisy received signals r(t) from N satellites are applied to a parallel bank 14 of independent delay lock loops and data demodulators 15. FIG. 1b shows two typical versions of the delay lock employing coherent and noncoherent tracking. The parallel set of measured pseudo-ranges (plus doppler or accumulated delta range (ADR) measurements on the carrier) are then fed to a Kalman filter estimator 15. There may or may not be additional sensors 16, e.g. altimeters, inertial measurement units (IMU's), dead reckoning instruments. If so their measurements are fed to the Kalman Filter 15 as well. Carrier tracking and some of these added sensors can also be used to aid the delay lock loop tracking operation. However, as shown in this configuration, each delay lock loop effectively is producing an independent estimate for each of the N pseudo-ranges for each of the N satellites. Each independent delay lock loop must operate with a closed-loop bandwidth which is sufficiently large to track the dynamics of the pseudorange of the satellite it is tracking. If there are more than four measurements being made and four or fewer unknowns, the system is overdetermined and clearly not all of their measurements are truly independent even though they are treated as such. The geometry of the satellite-user paths generally prevent the measurements from being truly independent.

The receiver includes two distinct parts: (1) an array of independent delay lock loop and signal demodulator elements, each of which processes the combined received signal to produce a pseudo-range value; and (2) a Kalman filter estimator that combines and filters the set of pseudo-range values with both pre-known and received satellite orbit data, to produce a series of estimates of the location of the receiver. Because each independent delay lock loop requires approximately the same bandwidth, each is subject to undesirable nonlinear thresholding effects which can cause loss of "lock" when the effective signal-to-noise ratio in that loop becomes sufficiently low.

Demodulators incorporated into each of the pseudo-noise code tracking DLLs recover low-rate digital modulation that indicates time and ephemeris data, in particular differences between the satellite orbit data stored in the receiver and the actual orbits, and satellite clock bias.

The Kalman filter may, in addition to the pseudo-range data, receive velocity inputs from carrier tracking loops, and radio altimeter or aneroid altimeter data. Its filtering function should remove from the pseudo-range inputs any components which are not representative of the motion of a platform or mobile member on which the receiver is located.

The most significant aspect of prior art receivers from the standpoint of my invention is that their plural delay lock loops and following Kalman filter act independently.

Prior art satellite radiolocation system receivers have typically derived position and time estimates from the signals from no more than four satellites. If more than four satellites are determined (from stored data in the receiver and an initial manual estimate of receiver position) to be in view, typically the receiver will seek to lock signals from the four that should afford greatest positioning accuracy. (An "ideal" configuration would, in this context, include one satellite directly overhead, with three others evenly spaced around the horizon.) Signals from satellites other than the selected four may be ignored until loss of a satellite signal occurs or is imminent due to earth eclipse.

Such a GPS receiver has the shortcoming that it does not make maximum use of information available from all satellites in view. Another shortcoming of prior art receivers is that the Kalman filter used is not adaptive; it is based on an assumed known model of the process that characterizes pseudo-range versus time.

Other shortcomings derive from the partitioned approach, whereby independent pseudo-range and relative velocity estimates are derived for each satellite prior to combining them to obtain an estimate of the user's four unknown values: x, y, z position of the user's receiving antenna, and the user clock's error.

For example, one of the delay lock loops may lose lock—that is, no longer tracking within about ½ chip of synchronism, and therefore unable to recover synchronism. This may happen because the signal it is tracking momentarily falls below the minimally usable (threshold) value. Until that satellite or another can be reacquired by the loop, the position estimate based on only three satellite signals will begin to depart from the true location.

In prior art GPS receivers, the fact that dynamics of the user's clock error are quite different from those of the user position are also not taken into account in selection of the individual delay lock loop noise bandwidth.

In receivers used on land or sea vehicles, the dynamics of the vertical position component will be substantially different from those of the other two components. This is not ordinarily taken into account in the Kalman filters of prior art receivers.

All of these shortcomings can be overcome by use of the present invention, utilizing digital circuit technology.

OBJECTIVES OF THIS INVENTION

While the minimum number of signals required for three-dimensional positioning plus time estimate is four, in practice a user usually has within view a larger number of satellites. As satellite-based radionavigation further evolves, there are likely to be additional transmitter satellites in view at most times and in most areas of the globe. For example, GPS satellites can be supplemented by GLONASS satellites and by ground transmitters or pseudolites and by geostationary communications satellites. One reason for this will be to ensure redundancy when satellites fail. Another will be to provide improved service for certain parts of the globe, for example in the polar regions. There, there are no GPS satellites directly overhead, since all orbits chosen for initial GPS satellites were inclined at 60 degrees to the equator. Another advantage is to provide increased total effective signal power for the receiver in the event of intentional or nonintentional interference, blockage of satellites by obstruction or shadowing (e.g., trees).

It may also prove practical to process signals from satellites in other radiolocation systems, such as the one set up by the former Soviet Union (GLONASS). As satellite-based radiolocation expands its use to a wider range of applications, it is possible that radiolocation transmitters may be installed on satellites used primarily for communication services. Even ground-based transmitters broadcasting wideband communications or television signals could be utilized to augment satellite communications in local areas.

Accordingly, a principal objective of this invention is to better utilize information derived by a radiolocation receiver from the entire array of transmitters from which it can receive and process signals.

Another objective is to utilize information from additional transmitters beyond the minimum number required to compute position and time estimates, to further improve accuracy of location and time estimates.

A further objective is to derive useful information from satellites whose signals would not be considered clear enough to serve as a basis for location estimate by prior art receivers. For example, if an interfering intentional or nonintentional jamming signal is received there may not be sufficient signal-to-noise ration for each individual delay lock loop to operate above threshold when operating independently but there may be sufficient signal-to-noise ratio for this vector delay lock loop.

Still another objective is to reduce the need for time-consuming re-acquisition of satellite signals as motion of the receiver with respect to terrain and other fixed and moving objects temporarily screens a satellite from view at the receiver antenna.

Yet another objective is to take advantage of the higher-performance digital processors that have become available since development of first-generation receivers for use with GPS.

Reference is made to a paper by E. M. Copps, et al., entitled "Optical Processing of GPS Signals", Navigation, Journal of the Institute of Navigation, Fall 1980, pages 171-182. The advantages of the vector delay lock loop of the present invention over the "optimal processor" described in the paper by Copps, et al., include the following:

1) The optimal processor in the Copps, et al. paper worked with an inertial navigation system as well as the GPS signals. The vector delay lock loop operates independently.

2) The optimal processor in the Copps, et al. paper did not take advantage of the larger number of satellites available. The vector delay lock loop advantage of the present invention accrues only when there are significantly more satellites than unknown variables.

3) The vector delay lock loop of the present invention employs a differential reference signal or equivalent which is unique to this system and not employed in the Copps, et al. processor.

4) The vector delay lock loop of the present invention need not employ any Kalman filter at all as did the Copps, et al. processor. As disclosed herein, a much simpler processor can be employed.

5) The Copps, et al. processor showed no substantial improvement in noise or jamming as compared to the conventional approach.

On the other hand, the vector delay lock loop of the present invention operating on 10 to 20 parallel signals offers a significant improvement in performance.

BRIEF DESCRIPTION OF THE DRAWINGS

The above and other objects, advantages and features of the invention will become more apparent when considered with the following specification and accompanying drawings wherein.

Although the invention has been described as a system receiving pseudonoise sequence modulated signals, it should be pointed out that the delay lock loop with a differentiated reference works equally well on a variety of other signals as well. For example, the transmitted signal can be of the form:

$$\Sigma\, a_i \sin(\omega_i t + \Phi)$$

and the received signal from satellite j with delay Tj is then:

$$\Sigma\, a_i \sin[\omega_i(t - T_j) + \Phi]$$

Such a signal is known as a side tone ranging signal. The differentiated reference signal for each correlator in the vector delay lock loop is then:

$$\Sigma\, \omega_i a_i \cos[\omega_i(t - \hat{T}_j) + \Phi]$$

where $\hat{T}_j$ is the estimate of the delay Tj. The vector delay lock system generalizes to any finite bandwidth ranging signal and can be used in either a coherent or noncoherent form.

DETAILED DESCRIPTION OF THE INVENTION

A principal feature of this invention is that, in normal operation, control signals for delay-locking of each satellite channel DLL are derived from the current estimated location vector (x, y, z, and time), rather than from the correlator output of the loop itself.

Figure 1A:
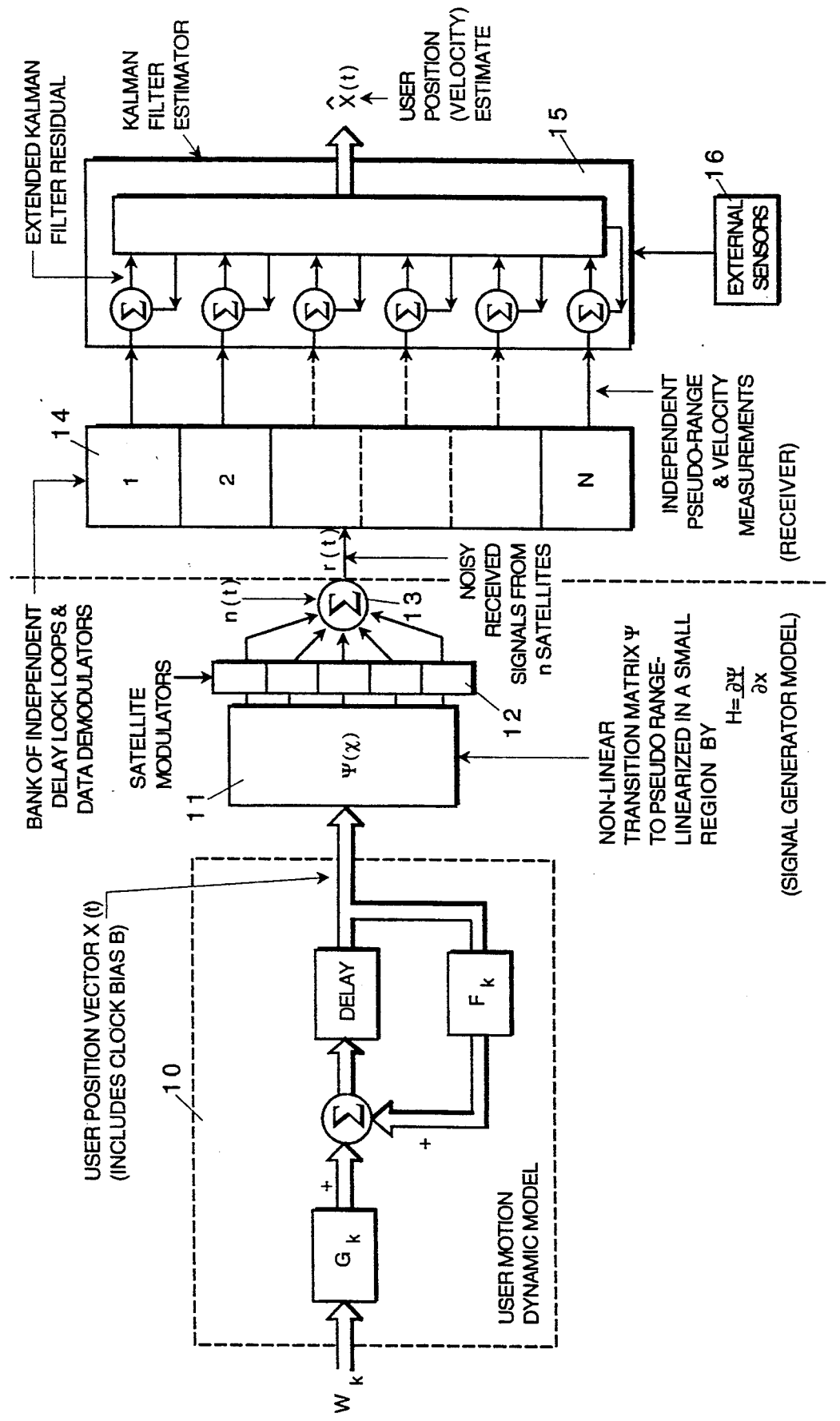
FIG. 1a is a block diagram of a conventional GPS radio location receiver showing separated parallel set of pseudo-range velocity measurements fed to a Kalman filter estimator.
Figure 1B:
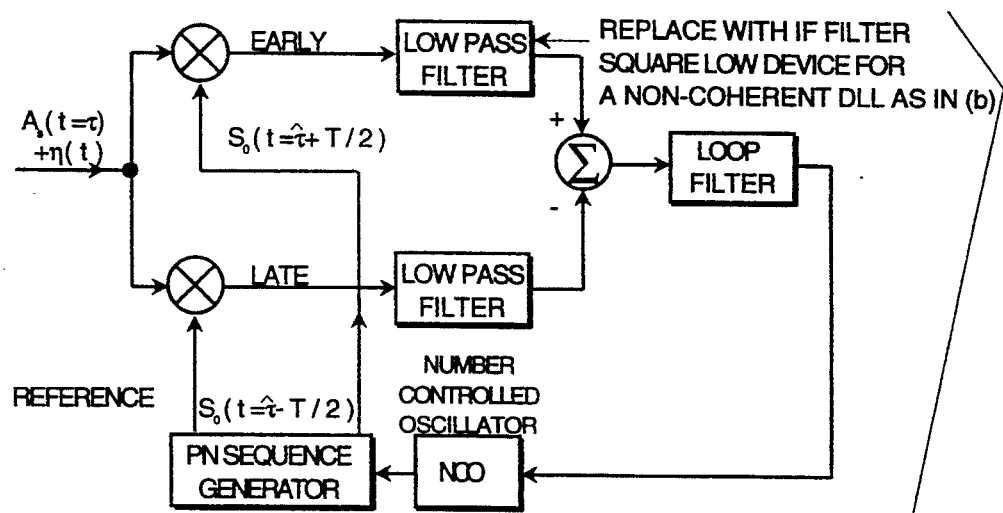
FIG. 1b shows two typical versions of the delay lock loop employing coherent and noncoherent tracking.
Figure 1B:
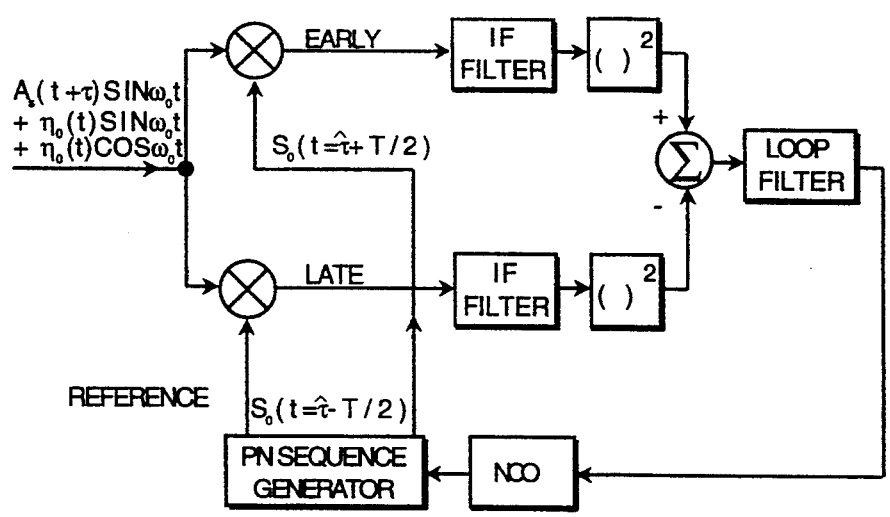
Figure 2:
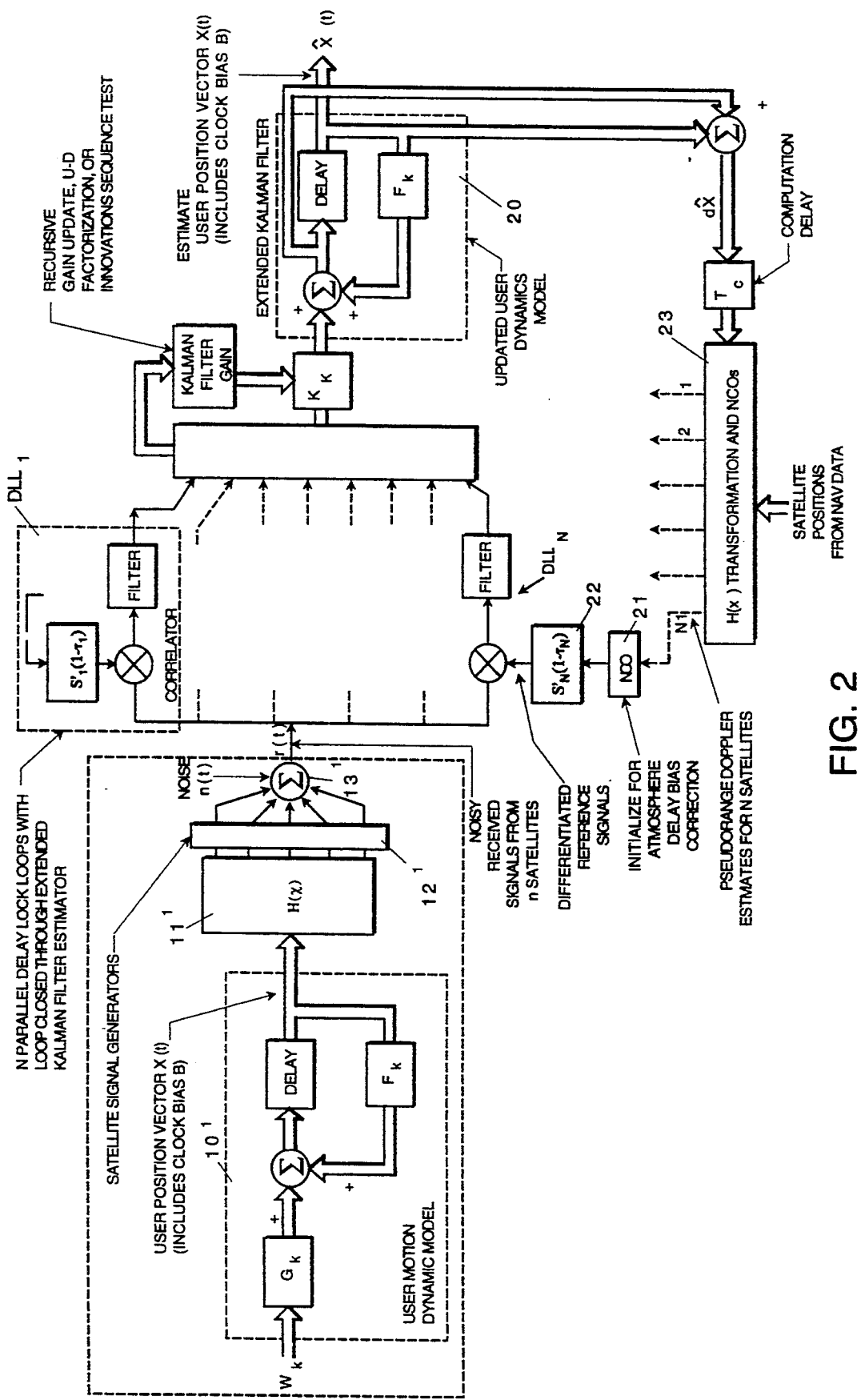
FIG. 2 is a block diagram of a GPS radio location receiver incorporating the vector delay lock loop of this invention.

FIG. 2 is a block diagram, similar in representation to that of FIG. 1, of a radiolocation receiver incorporating the present invention. The position estimate signal vector, suitably transformed (separately for each satellite transmitter) to take into account the direction and velocity of the transmitter, is fed back to the Number Controlled Oscillator NCO for the tracking loop for that transmitter.

Hence, the vector location estimate derived from the combination of all satellite and other inputs is employed in this invention to enhance tracking and demodulation for each satellite. The uncertainty of that delay estimate, when the receiver is locked to four or more satellite signals, is smaller than the uncertainties that must be dealt with by independent DLLs of prior art receivers since the number of unknowns is less than the number of satellites. Accordingly the precision of lock of each DLL is improved. The key point is that the threshold performance of the system is improved over that of a system which employs N independent delay lock loops. The vector delay lock loop makes use of the total power in all N received signals although it must only estimate 1, 2, 3 or 4 unknown variables depending on the applications.

As in prior art receivers, in this invention a Kalman filter estimator is used to detect and filter. FIG. 2 also depicts a signal controlling the gain of the integrated loop, derived from the sequence of estimates.

The dynamics of the user platform can be conveniently incorporated into the main filter/tacking loop, as depicted in the dashed rectangle, matching the User Motion Dynamic Model (on the left in FIG. 2) that represents the motion of the user platform. For example, if the platform is powered, the effects of its propulsion system can be incorporated into the model and will improve the tracking signal that reaches the NCOs of the delay tracking circuits.

The parallel delay lock loops $DLL_1 \ldots DLL_N$ are closed through the output vector X (x,y,z,time) from the position filter 20. The pseudo-noise reference signals from the NCOs 21 are time-differentiated in differentiator 22 to optimize tracking (as described by J. J. Spilker and D. T. Magill, "The Delay Lock Discriminator - An Optimum Tracking Device", Proceedings of the IRE, Sept. 1961, pp. 1403-1416). Alternative early-late gate and other forms are described in J. J. Spilker, Jr.'s Digital Communications by Satellite", Prentice Hall, 1977. The output vector X is transformed through the circuit 23 labeled H(x)TRANSFORMATION AND NCOs into a set of delay signals (1,2 3, ... N) that represent the location of each satellite. Each is then used to set the delay of its NCO 21, the output of which is differentiated to form the reference signal to a particular satellite DLL. For the transformation in circuit 23, satellite positions can be determined from stored data together with the transmitted data on orbit and clock biases. In older generations of technology the computation or transport delay for these filters was too long to be fed back to the DLL NCOs in a timely fashion. The advent of high speed microprocessors and Application Specific Integrated Circuits available now makes this design feasible and cost effective.

In prior art receivers, the independent signal correlators were maintained in lock by the output of each correlator. DLL dynamic behavior usually is related to platform dynamics. Almost any brief loss of track required a reacquisition search over a set of carrier frequencies and pseudo-range values. Using the present invention, the delay lock signal is derived from system data, filtered to represent true system dynamics. A brief signal hiatus should not cause the correlator loop to break lock, since the loop signal is based on redundant information and should drift very slowly.

FIG. 2 illustrates steps that can be taken to improve the accuracy and reliability of location estimation in my invention:

(a) include, in inputs to the NCOs, signals representing the atmospheric reduction of the velocity of signal propagation.

(b) update the gain $[K_K]$ of the Kalman filter 20. This can be done adaptively, with computations made on error data over intervals considerably longer than the update rate of the position estimate.

(c) adaptively change the platform dynamics model parameters $[F_K]$ with time, to represent actual user dynamic characteristics. For example, as fuel load of an aircraft of vessel is expended, platform dynamics will reflect the change.

(d) adjust the parameters of the H(x) transformations.

Many proven techniques are available for iterating the Kalman filter gain and position estimation parameters, including: covariance matrix factorization effects, Schmidt-Kalman variants of the Kalman filter, and adaptive Kalman filter gain utilizing tests on innovations sequence (sequence of new samples).

Not shown in FIGS. 1 or 2 are the receiver components required to acquire the satellite signals, or the microwave or ultra-high-frequency and intermediate-frequency analog circuits used to amplify frequency-shift the received signals.

With the exception of the signal correlators and the filters at their outputs, circuit elements depicted in FIG. 2 are most conveniently implemented using digital circuits. This is also typical of prior art GPS receivers. However, the enhancement of digital integrated circuit computing speed and clock rate, by orders of magnitude since the first GPS receivers were designed, makes feasible cost-effective receivers able to handle many times more signals x updates per second.

Figure 3:
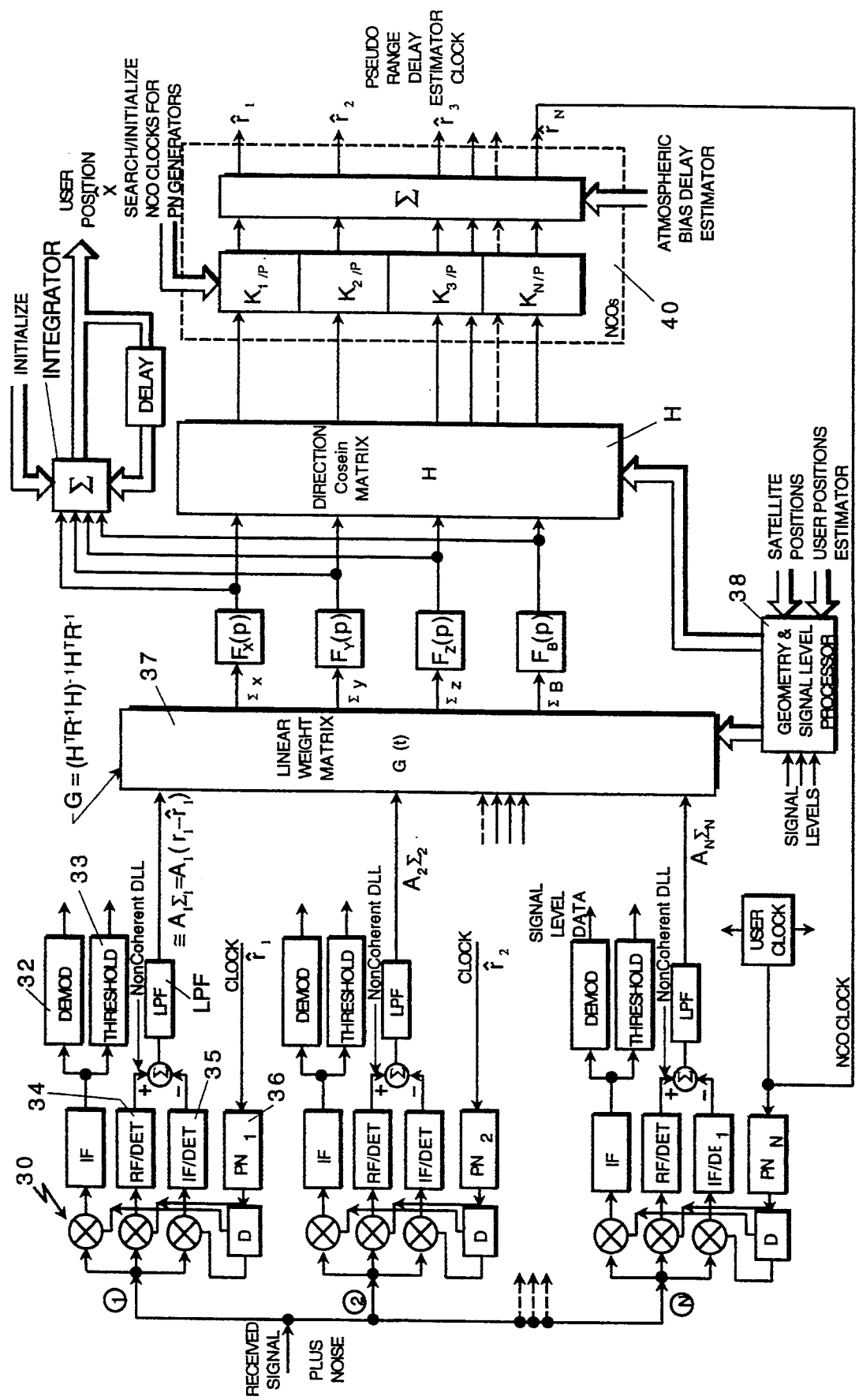
FIG. 3 is a more detailed block diagram of a preferred embodiment of the invention illustrating a quasi-optimal vector delay lock in a non-coherent form.

FIG. 3 depicts, in somewhat greater detail, a preferred embodiment of this invention. This configuration need not use the Kalman filter embodiment but can employ simpler although possibly time varying or switched bandwidth loop filters, somewhat akin to the filters employed in present art independent delay lock loops but now these filters are applied to filtering of the unknown position vector components x, y, z, t. The integrated loops in this case are unfolded, left to right. At left (1, 2, ... N) are a set of phase-locked loop signal trackers, incorporating separate correlators 30 to (a) demodulate data 32 and provide a threshold 33 indication, (b)track from RF 34 (incoherently) and (c) track coherently 35. Each tracker has an associated pseudo-noise input circuit 36 ($PN_1$, $PN_2$, ... $PN_N$), and a differentiator D. The output of a low-pass filter LPF for each channel is an estimate $A_m E_m$ (m=1,2,...,N). A Linear Weight Matrix 37, with parameters derived from the Geometry and Signal Level Processor 38 converts the range estimates into receiver-viewpoint estimates: $E_x$, $E_y$, $E_z$, $E_B$, where B represents receiver clock bias. After filtering through the four process-dynamic filters $F_x(p)$, etc., the user position estimate can be derived from these outputs. The direction Cosine Matrix H convert the filtered receiver-position estimate into signals suitable for the bank of NCOs 40 to its right. After correction for atmospheric propagation delay or other delay perturbation, the outputs go back to the correlators 30 via the pseudo-noise circuits 36 to close the loop.

While I have described a system in which all transmitters produce similar signal patterns and have similar dynamic characteristics, my invention is not limited to that type of system. It is applicable as well to systems containing several classes of transmitters or types of modulation. In that case, several demodulator variants could be used.

It could also be applied to systems in which some received signals were governed by different dynamics (and, therefore, different process models). In this case, correlator outputs for each type of signal would be combined through separate output filters, and the filter outputs combined to produce an output estimate and feedback signal. For example, the user clock is generally a narrow bandwidth process compared to the dynamics of the user motion.

The invention provides a position, time location system which is able to tolerate a larger amount of intentional jamming or nonintentional interference than the prior art independent parallel delay lock loop. For example, a receiver system with 3 independent unknown x, y, z parameters and a time unknown of relatively small information rate will only tolerate a limited amount of interference before the delay lock loops lose lock. If, for example, all satellite signals are of approximately equal strength, all of the independent delay lock loops will reach threshold at approximately the same interference or jamming level. A vector delay lock loop operating on the same set, say of 12 equal signal level GPS or other signals, can tolerate approximately 4 times the interference or jamming levels. This Call be a significant advantage for military applications as ship or airlines receivers can be subject to interference and navigation accuracy and safety is a prime objective. Likewise a vector delay lock loop operating on 20 received GPS and GLONASS satellites in parallel with only 2 unknown coordinates can have an improvement in interference tolerance of approximately 10 to 1 over a conventional implementation.

APPLICATION TO TERRESTRIAL BASED POSITIONING

Figure 4:
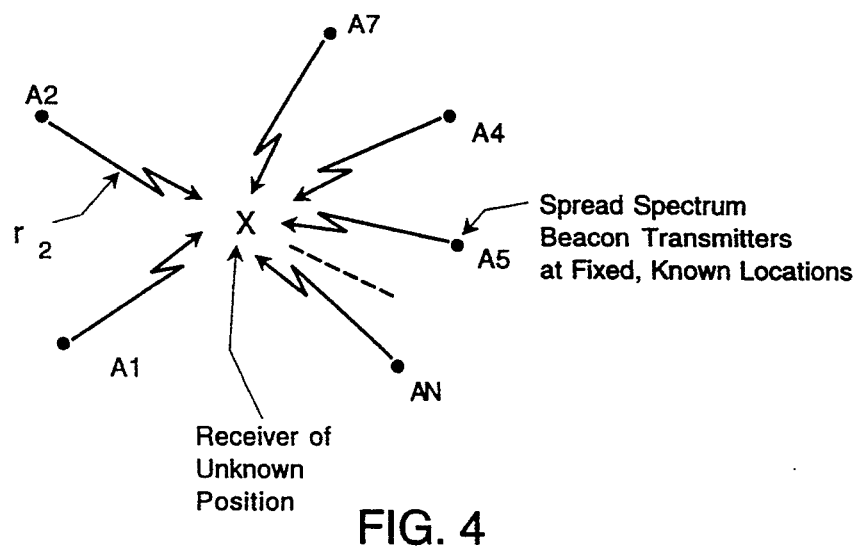
FIG. 4 is a schematic illustration of an application of the invention to a terrestrial-based radio system.

The vector delay lock loop of this invention can be employed not only with GPS satellites or other satellites as the signal source but also with ground-based transmitters or beacons. A set of beacons $A_1, A_2, A_3 \ldots A_N$ with known positions are shown in FIG. 4 along with a mobile vehicle user X at unknown and time-varying position (x,y) (assume that all elements are at sea level).

Each of the transmitters $A_1, A_2, A_3 \ldots A_N$ transmits a signal si(t) which is precisely timed. The beacon signal Si(t) may be a spread spectrum pseudo-noise signal. The received signal at the user site is then tile sum of N beacon signals plus received noise, namely:

$$R(t) = \Sigma ai\, si(t-ri) + ri(t)$$

where Ti is the delay corresponding to the range or pseudo range, ri(t) to beacon i. The receiver in the vehicle may also have to solve for its clock time error if the clock is not sufficiently accurate as well as its x,y coordinates if the receiver is at sea level which may be varying with time. In that instance there are 3 unknown coordinates. (The same problem may be solved with x,y,z coordinates.)

Thus the received signal for this ground-based set of transmitters is of very similar form to that for the GPS satellite signals. These signals may or may not carry data. The data may not be required since the transmitters are at fixed known locations.

Again the advantage of the vector delay lock loop is that it need only estimate the x,y coordinates and plus its clock bias—3 coordinates unknown where there might be a large number $N \gg 3$ transmitters and associated signals. Thus the performance of the vector delay lock loop can be greatly improved over that of N separate, independent delay lock loops followed by an independent position estimator, if $N \gg 3$.

Note that in a time transfer application to a user of known location, there is only one unknown coordinate.

Further background information regarding the invention is disclosed in the following papers written by applicant and incorporated herein by reference:

1) "Vector Delay Lock Loop Processing of GPS Signals",

2) "Fundamental and Optimization of GPS User Systems", copies of each attached hereto.

While preferred embodiments of the invention have been shown and described, it will be appreciated that other embodiments and adaptations will be apparent to those skilled in the art.

What is claimed is:

1. A location and time estimation receiver which estimates its own location from signals received simultaneously from a multiplicity of code-modulated remote transmitters whose instantaneous locations can be determined, comprising:

signal receiving and conditioning means including an antenna and frequency conversion circuitry, a plurality of delay controllable pseudo-noise oscillators, a plurality of signal correlators, each signal correlator receiving an input from said signal receiving and conditioning means and a second input from one of said delay-controllable pseudo-noise oscillator, a plurality of signal filters and demodulators, each deriving its input from one of said signal correlators, each producing an output representing distance and velocity measures of one transmitter to the receiver, respectively, computational circuits that convert said distance and velocity measures, together with information on transmitter locations, into a single estimate of the instantaneous location of the receiver, using geometric techniques to derive estimates and averaging to produce a single estimate from redundant inputs, an output filter whose response is representative of the process that constraints the relative motion of receiver and transmitter, and a feedback circuit for determining the time rate of change of the receiver position as a first vector, and combines said first vector with further vectors representing the known direction and velocity of each said code modulated remote transmitter, and transmits the results as a plurality of scalar delay control signals fed to said delay-controllable pseudorandom noise oscillators to improve the accuracy, threshold performance and stability of the position estimates output by the receiver in the presence of redundant received signal data, data, additive receiver noise, and jamming or nonintentional interference.

2. A location and time estimation receiver as defined in claim 1 wherein the signal correlators produce separate outputs representing respectively the range and the relative velocity between each remote transmitter and said receiver.

3. A location and time estimation receiver as defined in claim 1 wherein there are more than four each of correlators, filters, demodulators, and said feedback-computational circuits.

4. A location and time estimation receiver as defined in claim 1 wherein the computational circuit has a loop gain and the loop gain of said feedback computational circuit is continually varied using signals derived from said series of position estimates.

5. A pseudonoise code multiplexed location-estimation receiver adapted for simultaneous reception of signals from multiple transmitters of determinable location and motion and transmitting a repeating code sequence, comprising signal receiving and conditioning circuits, a plurality of delay controllable reference pseudonoise signal oscillators, and a like plurality of signal correlators driven by said plurality of delay-controllable reference pseudonoise signal oscillators, respectively, each signal correlator producing the repeating code sequence employed in a particular transmitter, means for combining said signal correlator signals to compute an estimated location of the receiver in three dimensions, along with a timing estimate, and a feedback circuit for converting said location output estimate into phase-delay signals for each reference pseudo-noise oscillator proportional to the direction, range and relative velocity of the transmitter whose signals it is processing.

6. A pseudonoise code multiplexed location-estimation receiver as defined in claim 5, wherein the sequence of location estimates is used adaptively to alter the computational parameters of said feedback circuit so that said location output estimate is constrained in the same way as is the physical movement of said receiver.

7. A side tone ranging multiplexed location-estimation receiver adapted for simultaneous reception of signals from multiple transmitters of determinable location and motion, each transmitter-transmitting a uniquely repeating code sequence, comprising signal receiving and conditioning circuits, a plurality of delay controllable reference pseudonoise signal oscillators, and a like plurality of signal correlators driven by said plurality of delay-controllable reference pseudonoise signal oscillators, respectively, each signal correlator producing the repeating code sequence employed in a particular transmitter, respectively, means for combining said signal correlator signals to compute an estimated location of the receiver in three dimensions and produce a location estimate output, and a timing estimate output, a feedback circuit for converting said location estimate output and timing estimate output into phase-delay signals for each reference oscillator proportionate to the direction, range and relative velocity of the transmitter whose signals it is processing, whereby the sequence of location estimate and timing estimate outputs is used adaptively to alter said phase-delay signals from said feedback circuit so that the estimated position sequence is constrained in the same way as is the physical movement of said receiver.

8. In a position-estimation receiver deriving its output estimates from received inputs from a remote, distributed array of four or more pulse-code multiplexed transmitters at determinable spatial positions, the improvement comprising, four or more delay-lock loop trackers, each measuring and indicating range data between the receiver and each transmitter, respectively, computational circuits for combining all said range data to determine an estimated receiver position based on said four or more transmitter-receiver ranges measured, an additional computation circuit to estimate, from the estimated receiver position and transmitter positions determined from initial information and transmitted data, a set of tracking delays appropriate to optimally track each transmitter through its associated tracker, and circuit means to feed the set of estimated tracking delays to the delay lock loop trackers, these elements acting collectively as a single integrated closed-loop position estimator.

9. In a position, time location receiving system deriving its output position estimates from received inputs from a remote, distributed array of at least four pseudonoise transmitter channels at determinable spatial positions, said receiving system having a plurality of delay lock loops, one for each transmitter, a method of enabling said system to tolerate a larger amount of intentional jamming or nonintentional interference comprising deriving control signals for said delay lock loops of each transmitter channel, respectively from a current estimated location vector (x, y, z) and time signal for said receiving system and applying said estimated location vector (x, y, z) and time signal as control signals to said delay lock loops.

* * * * *